Patented Dec. 9, 1924.

1,519,058

UNITED STATES PATENT OFFICE.

WILHELM ROHN, OF HANAU, GERMANY.

PROCESS OF MELTING METALS.

No Drawing.   Application filed September 22, 1921. Serial No. 502,588.

*To all whom it may concern:*

Be it known that I, Dr. WILHELM ROHN, chemist, a citizen of Germany, and resident of Hanau, Germany, have invented new and useful Processes of Melting Metals (for which he filed an application in Germany, September 22, 1920), of which the following is a specification.

Induction furnaces for melting metals are known and have found repeated application in the industry.

The working of such furnaces requires a conducting metallic secondary winding which must be therefore closed in itself. In order to obtain such a secondary closed circuit, the working was introduced by first inserting closed metal rings into the melting groove or trough and thereupon introducing the rest of the charge. The heating of the ring or rings, produced by the induction current, led to the heating, and finally to the melting, of the whole charge. The work was however also carried out by leaving in the furnace part of the molten metal from the last charge which was intended to form the closed conducting ring for the melting of the next charge.

Such a method of working was partly necessitated owing to the charge being in the form of pieces (scrap and the like), for the pieces of scrap filling the melting groove could be in contact only at a few points which moreover were as a rule very small, and badly conducted the current, as the scrap was often covered with rust and other badly conducting impurities, but mostly owing to the fact that the induction furnace, in its capacity of a transformer, made it possible to produce in the closed melting groove only a comparatively low voltage limited by the constructional conditions of the transformer. In starting the melting process it was therefore necessary that there should be already a good conduction of at least a perceptible 45 part of the charge.

The usual tension at the melting groove amounts to about 5–10 volts. Such a voltage is not sufficient, in view of bad conductivity of the charge, frequently broken by various small resistances, for bridging over the said resistances. Induction furnaces charged with scrap alone, even in a careful manner, could be therefore worked only in rare exceptional cases.

In order to obtain a tension of 5–10 volts in the melting groove, it was necessary to provide in the primary coil a fall of tension of the same size, that is to say of 5–10 volts per spire. This necessitated the use of transformers iron cross-sections which were several times greater than in other technical transformers in which the tension fall provided amounts generally only to ½–1½ volts per spire.

Experiments with arc light furnaces working with tensions of over 80 volts have shown that with these voltages the resistances appearing in a scrap charge could be bridged over and therefore the scrap melted down. If therefore it were posible to produce voltages of the same size in the melting groove of an induction furnace, charged with cold scrap, cold scrap could be melted in induction furnaces equally well as in arc light furnaces. In order to produce with the technically usual frequencies of 50 periods and less, falls of tension of the magnitude of 80–100 volts per spire, the iron cross-sections would have to be made 20—12 times greater than those required for producing 5–8 volts per spire, a construction which would fail on account of the question of price as well as of space and constructional difficulties. It is however possible to manage with the usual iron cross sections by increasing the frequency of the primary alternating current 20—12 times. The use of such frequencies, 500–1000 alternations per second, as would be required accordingly, offers however no difficulties to the modern engineer, there are even various methods available for the purpose, to which it is not necessary to refer in greater detail, as they are known.

The invention consists in using high frequency currents in order to eliminate the difficulties arising in melting cold scrap in induction furnaces, or at least to reduce them to such an extent as to avoid the insertion of metal rings into the melting groove, or the leaving therein of 20–30% of the preceding charge. In that way consecutive charges of the most widely different qualities could be produced independently of each other and all contamination of the next charges by the remainders of the preceding ones or by the inserted closed rings avoided.

The process according to the invention consists in first sending a current of higher frequency and a suitable voltage through a part of the primary coil and as the conductivity of the charge improves owing to the increasing fritting and to the beginning of melting, in taking care to reduce the frequency and, parallel with it, to increase the number of the primary spires, owing to which the voltage in the secondary groove is reduced in accordance with the conductivity in the same. For increasing and subsequently reducing again the frequency, could be used for instance the stationary frequency converters built with a favourable efficiency. In order to bring about an increase in the windings or spires of the primary coil, it is merely necessary to provide one or more "tapping" connections at suitable points or to use suitable subdivided primary coils.

As the melting groove of an induction furnace, charged with cold scrap pieces, is nothing else in principle than a kind of a fritter or coherer which retains a conductivity produced by quick vibrations after their cessation, and then affords easy passage to currents of low frequency or even to continuous currents, it will be in many cases sufficient, for the purpose of starting the melting process, to use electric energy quantities with greatly increased frequency which in themselves would be totally insufficient for bringing about the heating and the melting of the charge. It will be therefore sufficient for instance for producing an adequate fritting and conductivity of the scrap forming the charge in the melting groove, to introduce one tenth of the energy required for the melting, in the initial stage in the form of a high frequency current and then to complete the melting process with a low frequency current.

Undisturbed melting down of scrap in the melting groove of an induction furnace could also be effected by causing high frequency and low frequency current to act on the melting groove simultaneously through two suitable primary coils in which case the quantity of energy of the high frequency current need only be a fraction of the low frequency current. Such a method of working is always possible when a reaction of the high frequencies on the low frequency current generator is avoided by means of suitably arranged choking coils and the like devices, such as frequency sorters of suitable dimensions, and vice versa. In this arrangement the high voltage which is produced in the charge by the high frequency current, builds so to say a bridge for the simultaneously induced low frequency current which has to supply the quantity of energy required for the melting process. As soon as in this arrangement the fritting and the incipient melting of the charge have sufficiently progressed, the high frequency current and the device required for screening it off, can be switched off.

Unlike the known methods of working induction furnaces, the process according to the invention makes it possible to melt down charges in pieces without inserting into the melting groove closed conducting rings which often more or less contaminate the charge. It makes it possible also to remove completely any charge molten in the induction furnace, and therefore to clean the melting groove after the charge has been trapped off, from any impurities, slag or metal rests. Apart from the fact that it thus becomes possible to increase the output and to economize electric energy, these possibilities are specially important when it is a question of manufacturing specially pure metal alloys or alloys of a very exact composition. Of the greatest importance is however the possibility given by the invention to melt and to treat metals and metal alloys, the properties of which are inadmissibly affected by melting in well known furnaces exposed to the action of the air, in an induction furnace which is practically completely shut off from the atmosphere and in which metals or metal alloys are treated (or worked) under a pressure different from the atmospheric pressure.

Claims.

1. A process for melting down cold scrap in pieces in induction furnaces, characterized by a voltage several times greater being produced in the charge of the melting groove for the purpose of starting the heating and the melting, by supplying primary alternating current of a higher frequency than the normal one.

2. A process such as set forth in claim 1, characterized by the frequency of the primary current and therefore the voltage in the melting groove being gradually reduced as the fritting and the conductivity of the charge progresses.

3. A process such as set forth in claim 1, characterized by the alternating current of higher frequency being sent through one or more portions of the primary coil provided with tapping connections or subdivided.

4. A process such as set forth in claim 1, characterized by only a fraction of the total energy required for the melting, being supplied to the charge in the initial stage in the form of a high frequency alternating current, whereupon the high frequency alternating current is switched off, and low frequency current of greater energy contents switched in.

5. A process as set forth in claim 1 in which high frequency and low frequency alternating currents are simultaneously supplied to separate coils, with the use of suitable devices in the low frequency current supply to exclude high frequency currents from the low frequency generator and vice versa, in which the energy supplied by the high frequency alternating current is only a small fraction of the total energy required for melting a charge.

6. Application of the process set forth in claim 1 to induction furnaces worked with a pressure different from atmospheric pressure.

In testimony, that I claim the foregoing as my invention I have signed my name this 30th day of August 1921.

Dr. WILHELM ROHN.